United States Patent [19]
Lenz

[11] 4,369,581
[45] Jan. 25, 1983

[54] METHOD AND APPARATUS FOR THE DETERMINATION OF THE AXIS OF ROTATION OF A CIRCULAR TABLE IN MULTIPLE COORDINATE MEASURING INSTRUMENTS

[75] Inventor: Karl J. Lenz, Wetzlar, Fed. Rep. of Germany

[73] Assignee: Ernst Leitz Wetzlar GmbH, Postfach, Fed. Rep. of Germany

[21] Appl. No.: 193,717

[22] Filed: Oct. 3, 1980

[30] Foreign Application Priority Data

Oct. 6, 1979 [DE] Fed. Rep. of Germany ....... 2940633

[51] Int. Cl.$^3$ .............................................. G01B 5/25
[52] U.S. Cl. ................................ 33/169 C; 33/181 R; 33/172 D
[58] Field of Search ............ 33/169 C, 174 L, 174 Q, 33/180 R, 179.5 R, 172 D, 181 R, 1 M

[56] References Cited

U.S. PATENT DOCUMENTS 3,509,635  5/1970  Meinke ............................. 33/174 L
3,826,011  7/1974  D'Aniello ......................... 33/174 Q

FOREIGN PATENT DOCUMENTS 54-130156  10/1979  Japan ............................. 33/169 R

*Primary Examiner*—Willis Little
*Attorney, Agent, or Firm*—Schwartz, Jeffery, Schwaab, Mack, Blumenthal & Koch

[57] ABSTRACT

Disclosed is a method for determining the axis of rotation of a rotatable table in a multiple coordinate measuring instrument equipped with at least one tracer, comprising the steps of arranging a spatial contact surface eccentrically to the axis of rotation of the rotatable table; determining the position of a point associated with the contact surface, in the coordinate system of the multiple coordinate measuring instrument by contacting the contact surface with the tracer; repeating the determination step in at least two additional different angular positions of the rotatable table; determining the direction of the normal to a plane which contains the points determined in the at least three angular positions of the rotatable table; and determining the center of a circle passing through the at least three points, whereby the axis of rotation of the rotatable table is the normal passing through the center of the circle. Also disclosed is a device for carrying out this method.

15 Claims, 7 Drawing Figures

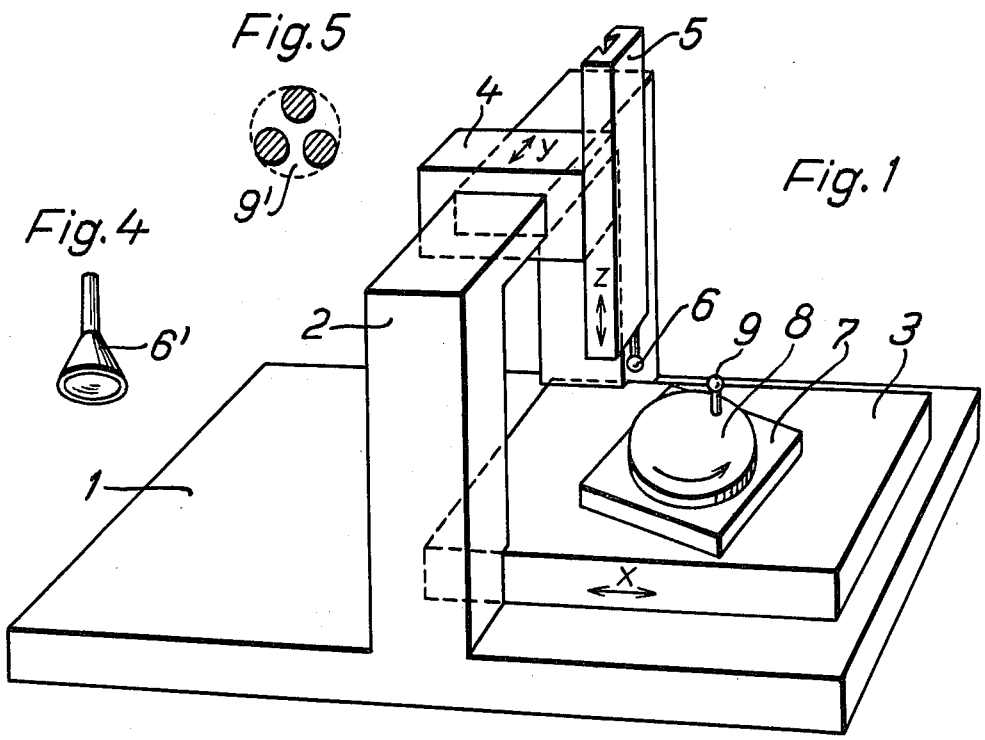

METHOD AND APPARATUS FOR THE DETERMINATION OF THE AXIS OF ROTATION OF A CIRCULAR TABLE IN MULTIPLE COORDINATE MEASURING INSTRUMENTS

BACKGROUND OF THE INVENTION

The present invention relates to a method and an apparatus for carrying out this process to determine the axis of rotation of a circular table in a multiple coordinate measuring instrument equipped with at least one tracer or feeler probe.

In the case of essentially cylindrical workpieces, measurement in a multiple coordinate measuring instrument is significantly simplified if the workpiece is rotated with respect to the tracer. With any workpiece, the rotation enhances the ease of operation, because the tracer may thereby be kept within the sight of the operator. For this purpose, the workpiece is clamped onto a circular table which may be rotated and displaced to any position within the working space of the multiple coordinate measuring instrument. The coordinates of the workpiece are related to the axis of rotation of the circular table, so that the coordinates of the axis of the rotation in the coordinate system of the instrument must be known. The determination proceeds based on the fact that, in the general case, the direction of the axis of rotation of the circular table does not coincide with any of the coordinate directions of the coordinate system of the instrument.

It is known from a reprint of a manuscript paper presented at the 8th Working Conference of the Institut fuer Produktionstechnik und Automatisierung (Institute for Production Technology and Automation) (IPA) on the "Erfahrungsaustausch Drei-Koordinaten-Messgeraete '77" ("Exchange of Experience with Three Coordinate Measuring Instruments '77") held in Stuttgart, Sept. 14-15, 1977, that the axis of rotation of a circular table may be determined by calculation from the axis of a test piece ascertained in two angular positions of the circular table. The axis of the test piece is determined by means of contact with cylindrical surfaces of the test piece both in the 0° and the 180° position of the circular table with the aid of the cylinder program contained in the measuring apparatus. The line of symmetry of the two axes determined is the axis of the circular table.

This method cannot be used in the case of workpieces without explicit cylindrical surfaces, and even when such surfaces are present, it depends very strongly on the quality of the surface and its geometrical dimensions. Thus, in principle, the determination of the axial direction in the case of cylinders is of an accuracy that declines with decreased heights of the cylinder.

The error of the measurement is repeated in the position rotated by 180° of the workpiece and is not averaged out in the course of the determination of the line of symmetry.

SUMMARY OF THE INVENTION

It is therefore the object of the invention to provide an improved method for determining the axis of rotation of a circular table in a multiple coordinate measuring instrument.

A further object of the invention resides in providing such a method which permits determination independently of the workpiece and with an improved accuracy of the determination.

It is also an object of the invention to provide an apparatus for carrying out this improved method.

In accomplishing the foregoing objects, there has been provided according to one aspect of the present invention a method for determining the axis of rotation of a rotatable table in a multiple coordinate measuring instrument equipped with at least one tracer. The method comprises the steps of arranging a spatial contact surface excentrically to the axis of rotation of the rotatable table; determining the position of a point associated with the contact surface, in the coordinate system of the multiple coordinate measuring instrument by contacting the contact surface with the tracer; repeating the determination step in at least two additional different angular positions of the rotatable table; determining the direction of the normal to a plane which contains the points determined in the at least three angular positions of the rotatable table; and determining the center of a circle passing through the at least three points. The axis of rotation of the rotatable table is the normal passing through the center of the circle. In one embodiment, the position of the point associated with the contact surface is determined by contacting the contact surface at a plurality of points not lying on a single plane, whereas in another embodiment, the position of the point is determined by contacting the contacting surface with a self-centering tracer in a single measuring step.

In accordance with another aspect of the invention, there has been provided a multiple coordinate measuring instrument for carrying out the above-described method. This instrument comprises a base; a support member which is slidable on the base along one coordinate direction; a rotatable specimen table mounted on the support member; a bridge member positioned above the base; a tracer mounted on the bridge and extending to a position adjacent to the table, wherein the tracer is movable on the bridge along the other two coordinate directions; a calibration for determining the three coordinates of each position of the tracer with respect to the table; and a spatial contact surface detachably placed on the table for contacting by the tracer.

Further objects, features and advantages of the present invention will become apparent from the detailed description of preferred embodiments which follows, when considered together with the attached figures of drawing.

BRIEF DESCRIPTION OF THE DRAWINGS

In the drawing

FIG. 1 is a schematic perspective view of a multiple coordinate measuring apparatus according to the invention, having a tracer, a circular table and a sphere as the contact surface;

FIGS. 2a, 2b and 2c are isolated perspective views of a circular table with a contact sphere in three angular positions;

FIG. 3 is a perspective view of a circular table schematically illustrating the evaluation of the tracer results;

FIG. 4 is a perspective view of a special tracer configuration; and

FIG. 5 is a top view of a triple sphere as the contact surface.

DETAILED DESCRIPTION OF PREFERRED EMBODIMENTS

According to the present invention, a method is provided wherein:

(a) an additional spatial contact surface is associated with the circular table, excentrically to the axis of the rotation of the circular table;

(b) the position of a point associated with this surface is determined in the coordinate system of a multiple coordinate measuring instrument, by means of contact at an adequate number of points with the surface;

(c) the determination of the position of the associated point is repeated in at least two additional angular positions of the circular table;

(d) the direction of a normal to a plane containing the points determined in at least three angular positions of the circular table is determined; and (e) the center of a circle passing through at least three points is determined.

The process may be simplified by effecting the determination of the position of the associated point in accordance with step (b) by means of the self-centering tracing by the tracer in a single measuring step. It is of advantage to have the angular positions according to step (c) differ by approximately 120° with respect to the initial setting.

In an apparatus for carrying out the process according to the invention, in a particularly advantageous embodiment, a sphere is provided as the contact surface, wherein the associated point is the center of the sphere. For the embodiment of the process employing self-centering tracing by the tracer, in particular a triple sphere is provided, wherein the associated point is given by the coordinates of the tracer. Alternatively, a spherical or prismatic surface incorporated into the surface of the circular table may be provided as the contact surface, with the associated point being given by the coordinates of the tracer. In order to further increase the accuracy of the measurements, the contact surface may be placed at the outer edge of the circular table.

In comparison to the known method, the process of the invention is distinguished by the fact that a contact surface independent of the workpiece is used. This may consist, in particular, of a spherical surface, already in existence, for use as a calibration means, when working with multiple coordinate measuring instruments. This spherical surface is located directly on the circular table at any point outside the axis of rotation, or is connected with the workpiece clamped to the circular table. By means of the use of the additional contact surface, the determination of the axis of rotation may be adapted individually to each measuring problem.

Another distinguishing characteristic is that, in the process of the invention, primarily not axes but points are being determined. For the determination of the center of a sphere, at least four contacts not located in the same plane are required. For the sure identification of other spatial surfaces, such as, for example, cylinders, cones or cubes, under certain conditions a higher number of contacts may be required. This is known to those skilled in the art.

The program for determining the center of the sphere, which is ordinarily present in the measuring apparatus, determines the center by means of four individual measurements. In the process, errors of each individual measurement are largely averaged out, so that the determination of the plane extending through the three associated points and of the circle are based on highly accurate initial values. The accuracy of the determination of the axis of rotation is further enhanced by the fact that the surface area including the three points may be very large.

For the determination of a plane containing several measured points and their normals, and for the determination of a circle passing through three measured points and its center, suitable routine computer programs are available. The new process thus has the particular advantage that it is not necessary to expand the equipment of the measuring apparatus.

In the drawing, the course of the method according to the invention is represented schematically, together with a suitable device for carrying out the method.

The multiple coordinate measuring apparatus shown in FIG. 1 comprises a base 1 with a bridge 2. A slide 3 is mounted slidably in the x direction on the base 1. Another slide 4 may be displaced on the bridge 2 in the y direction. On the slide 4, the holder 5 of the measuring tracer may be moved in the z direction, so that tracer 6 may travel in the direction of all of the coordinates in the working space of the measuring apparatus.

On the x slide 3, in an arbitrary position, a circular table is arranged. It consists of a base frame 7 with conventional driving devices and the angular measuring system, and the rotating plate 8 with the clamping means for a workpiece (not shown). Even though the bearing surface of the base frame 7 and the surface 8 of the rotating plate should be parallel to each other, because of manufacturing tolerances, imperfect seating of the base frame, and the like, the axis of rotation of the circular table 7 at any particular point in time is generally not parallel to any of the coordinate axes x, y, z of the measuring apparatus. In order to determine this axis, a commercial calibrating ball 9 is mounted in the illustrated embodiment, in the peripheral area of the rotating plate 8.

FIG. 2a is a partial view illustrating the rotating plate 8 with the contact ball 9 in its initial position, and the contact ball 9 is shown in two further angular positions in FIGS. 2b and 2c. The position of the ball 9 in relation to the surface of the rotating plate naturally remains unchanged in the process. In each of these positions the ball 9 is contacted by the tracer 6 in at least four points not located in a single plane. From these measured coordinate values, the coordinates of the sphere centers $P_1$, $P_2$ and $P_3$ are calculated in the known manner. These are illustrated in FIG. 3.

Subsequently, again by known mathematical laws, a plane containing the points $P_1$, $P_2$ and $P_3$ is calculated. The direction of the normal to this plane, indicated in FIG. 3 by an arrow, is the direction of the axis of the circular table sought. A circle passing through the three points is further calculated.

The center of this circle, represented in FIG. 3 by a cross at the foot of the normal, represents a point on the axis of the circular table. Thereby, the axis of the circular table is determined in its direction and position in the coordinate system of the measuring apparatus.

The contacting of the ball 9 may be simplified by designing the tracer in the shape of a funnel 6', as shown in FIG. 4, or by representing the contact surface by means of a triple sphere 9', in accordance with FIG. 5. Automatically operating multiple coordinate measuring instruments are then capable of automatically centering the tracer and the contact surface with respect to each other and to indicate the tracer coordinates found for these positions.

What is claimed is:

1. A method for determining the axis of rotation of a rotatable table in a multiple coordinate measuring instrument equipped with at least one tracer, comprising the steps of:
   arranging a spatial contact surface excentrically to the axis of rotation of the rotatable table;
   determining the position of a point associated with the contact surface, in the coordinate system of the multiple coordinate measuring instrument by contacting the contact surface with the tracer;
   repeating the determination of the position of said point in at least two additional different angular positions of the rotatable table;
   determining the direction of the normal to a plane which contains the points determined in the at least three angular positions of the rotatable table; and
   determining the center of a circle passing through the at least three points, whereby the axis of rotation of the rotatable table is the normal passing through the center of the circle.

2. A method according to claim 1, wherein the position of the point associated with the contact surface is determined by contacting the contact surface at a plurality of points not lying on a single plane.

3. A method according to claim 1, wherein the position of the point associated with the contact surface is determined by contacting the contacting surface with a self-centering tracer in a single measuring step.

4. A method according to claim 1, wherein the different angular positions of the rotatable table differ from the initial setting by approximately 120°.

5. A method according to claim 1, wherein the contact surface comprises a spherical surface and the point is the center of the sphere.

6. A method according to claim 3, wherein the self-centering tracer comprises a funnel shape.

7. A method according to claim 1, wherein the spatial contact surface is arranged near the periphery of the rotatable table.

8. A method according to claim 1, wherein the contact surface comprises a triple sphere and the point comprises the coordinates of the tracer.

9. A method according to claim 1, wherein the contact surface comprises a surface incorporated into the surface of the rotatable table and the point comprises the coordinates of the tracer.

10. A multiple coordinate measuring instrument for determining the axis of rotation of a rotatable table in said instrument, said instrument comprising;
    a base;
    a support member which slidable on said base along one coordinate direction;
    a rotatable specimen table mounted on said support member;
    a spatial contact surface detachably mounted on said table excentrically to the axis of rotation of said table;
    a bridge member positioned above said base;
    a tracer mounted on said bridge and extending to a position adjacent said table, said tracer being movable on said bridge along the other two coordinate directions to contact said spatial contact surface at at least three different angular positions of said rotatable table for determining the position of a point associated with said spatial contact surface in said different angular positions; and
    calibration means for determining the three coordinates of each position of the tracer with respect to said table.

11. An instrument according to claim 10, wherein said contact surface comprises a spherical surface.

12. An instrument according to claim 11, wherein said tracer comprises a funnel shape large enough to accommodate said spherical surface therein, whereby the tracer will self-center when contacted with said spherical surface.

13. An instrument according to claim 10, wherein said contact surface comprises a triple where.

14. An instrument according to claim 10, wherein said contact surface is mounted near the periphery of said table.

15. An instrument according to claim 11 wherein said tracer is constructed to contact said contact surface at at least four points in each angular position of said rotatable table.

* * * * *